(12) United States Patent
Pisciotti

(10) Patent No.: US 7,008,088 B2
(45) Date of Patent: Mar. 7, 2006

(54) LIGHTING AND SAFETY UNIT FOR TRAILER HITCH

(75) Inventor: Richard J. Pisciotti, 1781 E. Palmyra Rd., Palmyra, NY (US) 14522

(73) Assignee: Richard J. Pisciotti, Palmyra, NY (US)

( * ) Notice: Subject to any disclaimer, the term of this patent is extended or adjusted under 35 U.S.C. 154(b) by 24 days.

(21) Appl. No.: 10/743,293

(22) Filed: Dec. 23, 2003

(65) Prior Publication Data
US 2004/0156205 A1   Aug. 12, 2004

Related U.S. Application Data

(60) Provisional application No. 60/445,797, filed on Feb. 10, 2003.

(51) Int. Cl.
*B60Q 1/00* (2006.01)
*B60Q 3/00* (2006.01)
(52) U.S. Cl. .................................. 362/485; 362/549
(58) Field of Classification Search ................ 362/485, 362/549
See application file for complete search history.

(56) References Cited

U.S. PATENT DOCUMENTS

| | | | | |
|---|---|---|---|---|
| 3,487,359 A | * | 12/1969 | McClintock | ................ 362/540 |
| 3,796,333 A | * | 3/1974 | Goldstein | ................... 414/462 |
| 3,887,093 A | * | 6/1975 | Howell | ........................ 414/532 |
| 4,613,847 A | * | 9/1986 | Scolari et al. | ............... 340/473 |
| 4,800,471 A | * | 1/1989 | Lippert | ....................... 362/485 |
| 4,922,223 A | * | 5/1990 | Prevot | ......................... 340/473 |
| 5,157,591 A | | 10/1992 | Chudzik | |
| 5,683,165 A | * | 11/1997 | Gold | ........................... 362/501 |
| 6,012,828 A | | 1/2000 | Pearce | |
| 6,260,752 B1 | * | 7/2001 | Dollesin | ...................... 224/524 |
| 6,302,567 B1 | * | 10/2001 | Gamble, Sr. | ................ 362/505 |
| 6,379,028 B1 | | 4/2002 | Crouse et al. | |
| 6,409,367 B1 | * | 6/2002 | Pratt | ........................... 362/505 |
| 6,886,968 B1 | * | 5/2005 | Hamelink et al. | .......... 362/485 |

* cited by examiner

*Primary Examiner*—Stephen Husar
*Assistant Examiner*—Jason Han

(57) ABSTRACT

A lighting and safety unit for a vehicle trailer hitch providing enhanced rearward lighting to a motor vehicle for safety. The unit has a T-shaped support made from square tubing adapted for being received in a trailer hitch. The T-shaped support has a crossbar and a mounting bar perpendicular to the crossbar. A pair of halogen lamps are disposed at opposite ends of the crossbar. An accessory post is mounted on the mounting bar and may support additional lighting accessories, such as an elevated lighting assembly or a strobe light assembly.

5 Claims, 7 Drawing Sheets

LIGHTING AND SAFETY UNIT FOR TRAILER HITCH

CROSS-REFERENCE TO RELATED APPLICATION

This application claims the benefit of U.S. Provisional Patent Application Ser. No. 60/445,797, filed Feb. 10, 2003.

BACKGROUND OF THE INVENTION

1. Field of the Invention

The present invention relates to auxiliary and safety lighting systems for a motor vehicle, and more particularly to a lighting and safety unit for motor vehicles that may be easily attached to and removed from a vehicle's existing trailer hitch and that provides a facility for mounting of additional safety accessories.

2. Description of Related Art

Motor vehicle lighting systems provide lighting for operation of the motor vehicle after dark. Typically, standard, factory installed, equipment for motor vehicles includes headlights that are well suited to driving in the dark. Factory installed taillights and backup lights typically provide weak lighting that illuminates for a limited distance and area, and may provide limited nighttime visibility at best. When operating the vehicle in reverse, the limited lighting, along with a typically restricted rearward view, may cause difficulty for the driver and may create a safety hazard for people and objects or property near the vehicle.

Vehicle headlights are often called upon to provide supplemental lighting for diverse outdoor activities. Vehicle headlights have provided supplemental lighting for emergency roadside service or repairs, illumination of a campsite while campers erect a tent after dark, lighting of work sites, and countless other outdoor lighting functions. However, the limited aim and focus of the vehicle headlights usually limits the effectiveness of such uses.

To address the fundamental safety concern of inadequate rearward lighting of motor vehicles, and to provide an improved light source for work or recreation involving a motor vehicle, an improved vehicle lighting and safety unit is desired.

U.S. Pat. No. 6,379,028, issued on Apr. 30, 2002 to C. R. Crouse et al., discloses a supplemental reverse lighting apparatus for motor vehicles. The apparatus consists of one or more lamp assemblies contained within an enclosed plastic housing. The housing has a shank that is used to attach the apparatus to a vehicle's trailer hitch. While the device provides improved rearward lighting, the lamps cannot be readily adjusted or re-aimed to suit a particular situation or need. This limits the device's usefulness, especially for special purpose vehicles, such as farm tractors or construction equipment, where other fixtures attached to the vehicle might block the light. Additionally, the plastic construction of the light housing will not offer significant protection for the lighting apparatus itself or for the vehicle in the event the vehicle is backed into an obstruction.

An attachable vehicle lighting system, disclosed by U.S. Pat. No. 5,157,591, issued on Oct. 20, 1992 to M. J. Chudzik, is intended to overcome the problem of blocked lights inherent when objects, such as a bicycle rack filled with bicycles, are attached to a vehicle. The system disclosed is basically a pair of separate auxiliary lights that may be hung from, or tied or strapped to, various parts of a vehicle or devices attached to the vehicle. In one embodiment, the lights are attached to an extension bar that is attached to the vehicle or the various devices attached to the vehicle. While this system may be useful to overcome the problem of lights that are blocked by accessory devices attached to the vehicle, its use is somewhat limited. The auxiliary lights themselves are not adjustable. The lights will be pointed in a direction dictated by the available mounting place on the vehicle or the vehicle's attached accessory. Additionally, depending on the vehicle and any accessories attached thereto, it may be difficult to find a suitable place to attach the lights as needed.

U.S. Pat. No. 6,012,828, issued on Jan. 11, 2000 to G. A. Pearce, shows a device for attaching a light to a trailer hitch frame. The device is essentially a bracket to carry the light, with fixtures to retain tie wraps that are used to secure the bracket to the trailer hitch frame. The tie wraps are wrapped around the trailer hitch frame and secured to hold the light bracket in place. Tie wraps, typically made of plastic, are often made such that, once fastened, they cannot be unfastened. Thus, to remove the lights after they have been mounted may require cutting the tie wraps, further requiring that the tie wraps be replaced each time the lights are removed and replaced. Even if the tie wraps are releasable, they will become worn over time and require replacement before they break and possibly result in a lost or damaged light.

None of the above inventions and patents, taken either singly or in combination, is seen to describe the instant invention as claimed. Thus, the lighting and safety unit for a trailer hitch of the present invention solving these problems is desired.

SUMMARY OF THE INVENTION

The lighting and safety unit of the present invention is an enhanced vehicle lighting system that provides bright safety and supplemental lighting, having a pair of halogen, or similar, lamps pivotally mounted to a crossbar assembly that may be easily mounted on and removed from a vehicle. A mounting shank is inserted into the vehicle's trailer hitch receiver box, or bolted to the vehicle bumper, to mount the unit to the vehicle. The lamps are located at the ends of a crossbar, attached by brackets that will allow the lamps to be reoriented, directing the light as needed. An accessory mounting post allows the mounting of lighting and safety accessories, including an additional elevated light bar and a safety strobe. The elevated light bar provides an additional pair of lamps elevated to several feet above the trailer hitch. The elevated light bar may be turned to redirect the upper lights in any direction. The safety strobe provides an additional backup signal to other vehicles and people in the area that the vehicle is about to be backed up.

Accordingly, it is a principal object of the invention to provide improved vehicle safety by increasing the amount and brightness of "backup" lighting when a vehicle is operated in reverse.

It is another object of the invention to provide an easily adjustable rearward lighting assembly having lights that can be easily reoriented to direct light as needed.

Still another object of the invention is to provide a vehicle-mounted source of additional lighting for work, recreational, and other purposes.

Yet another object of the invention is to provide an enhanced vehicle lighting system that may be easily mounted to and removed from a vehicle's trailer hitch receiver box.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
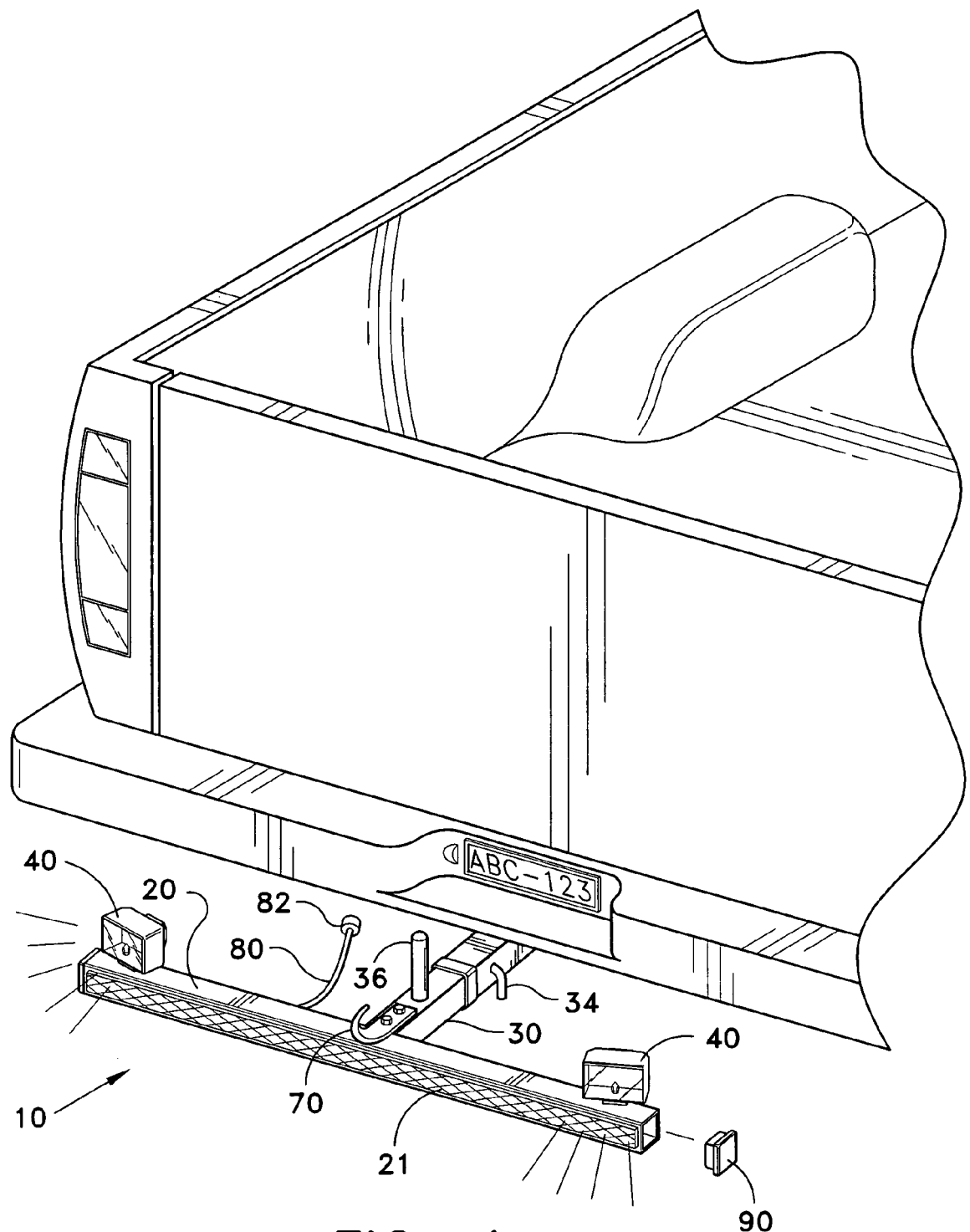
FIG. 1 is an environmental, perspective view of a lighting and safety unit for a trailer hitch according to the present invention.

The present invention is a lighting and safety unit for a vehicle trailer hitch, designated generally as 10 in the drawings. The lighting and safety unit 10 is designed to provide a safety and general purpose lighting source that may be easily attached to and removed from a vehicle. The lighting and safety unit 10 provides enhanced rearward lighting for improved ease and safety in operating a motor vehicle in the dark. The lighting and safety unit 10 also provides an additional source of general purpose lighting that may be useful for work, recreational, and other activities in the dark.

Figure 2:
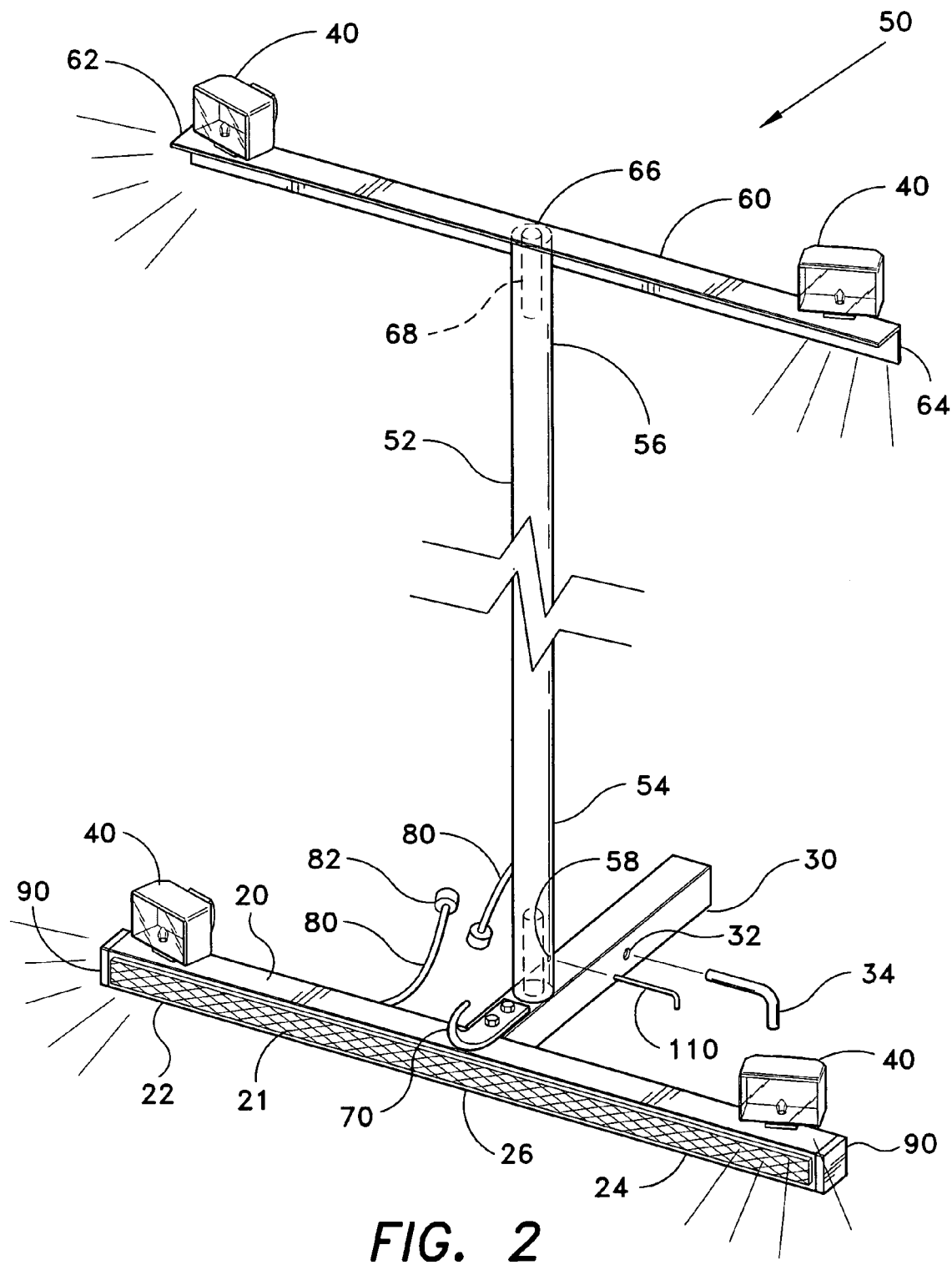
FIG. 2 is a perspective view of the lighting and safety unit for a trailer hitch with an elevated lighting bar attached.

Referring to FIGS. 1 and 2, the lighting and safety unit 10 includes a crossbar 20 having first and second ends 22, 24, and a longitudinal center 26. A mounting bar 30 is attached perpendicularly to the crossbar 20 at the longitudinal center 26 of the crossbar 20. Mounting bar 30 is of a size and shape to be mounted by insertion into a standard vehicle trailer hitch receiver. Two inch square steel box tubing material is preferred for both the mounting bar 30 and crossbar 20. The square tubing is an appropriate size and shape for insertion into a standard vehicle trailer hitch receiver, and the use of steel box tubing allows the lighting and safety unit 10 to provide added collision protection to the vehicle, in addition to improved lighting. End caps 90 close the ends 22, 24 of crossbar 20. An aperture 32, seen in FIG. 2, is formed in the mounting bar 30 for receiving a locking pin 34 which secures the crossbar assembly to the receiver hitch. The lighting and safety unit 10 is mounted to the vehicle with the crossbar 20 in a horizontal orientation. While the preferred method for mounting the lighting and safety unit 10 is by inserting the mounting bar 30 into the vehicle's trailer hitch receiver, an alternate method, such as welding or bolting the mounting bar 30 to the vehicle's bumper, could be used.

A tow hook 70 is mounted on the lighting and safety unit 10. Preferably, the tow hook 70 is bolted to the mounting bar 30 near the attachment to the crossbar 20. An accessory mounting post 36 is affixed vertically to the mounting bar 30.

For additional safety, a reflector 21 is affixed to the crossbar 20. A single strip of a reflective tape, running the length of the crossbar 20, provides a maximum reflective area. Alternatively, the reflective tape could be applied as multiple short strips. Other reflective devices could be substituted.

Figure 4A:
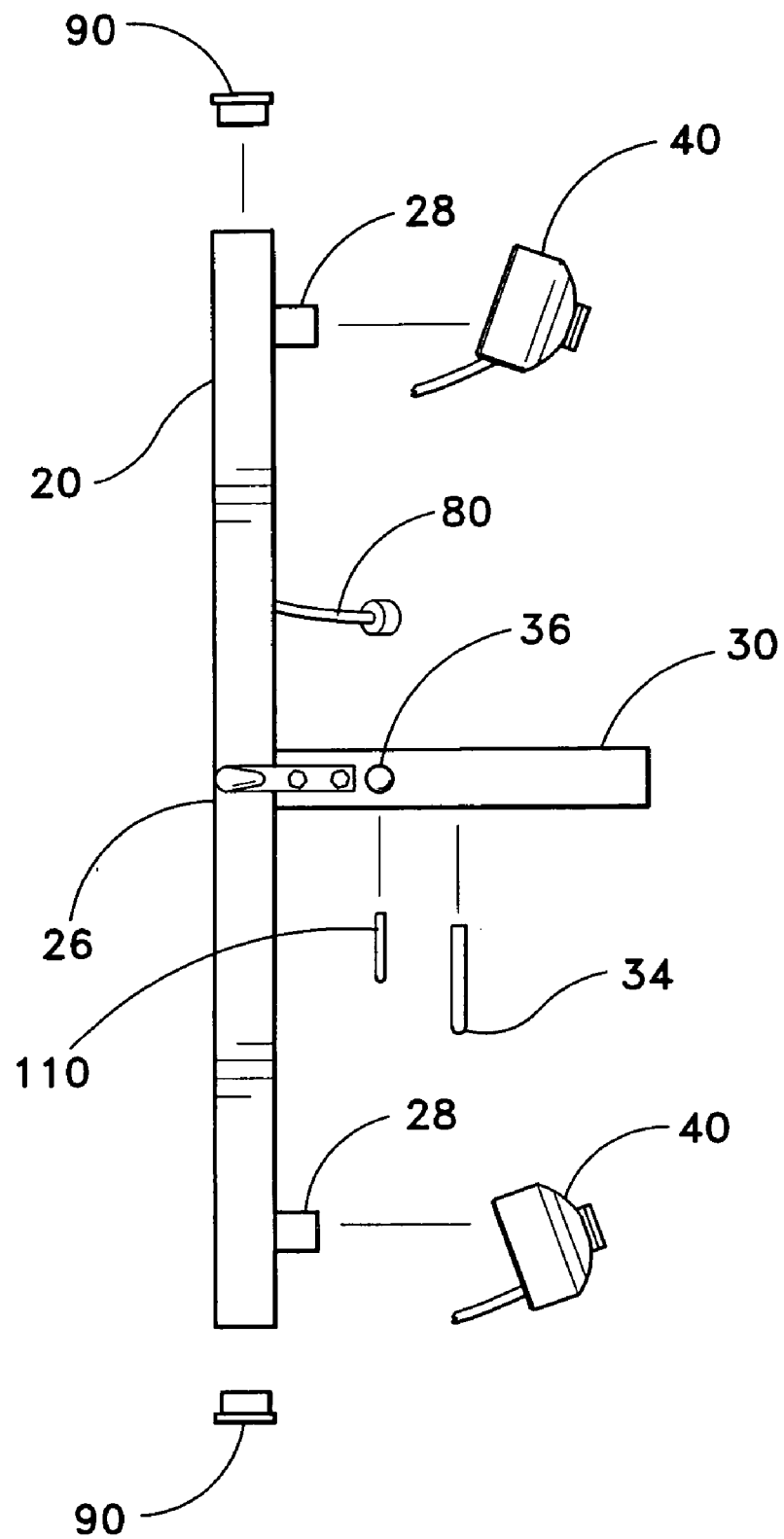
FIG. 4A is a top elevational view of the lighting and safety unit for a trailer hitch.
Figure 4B:
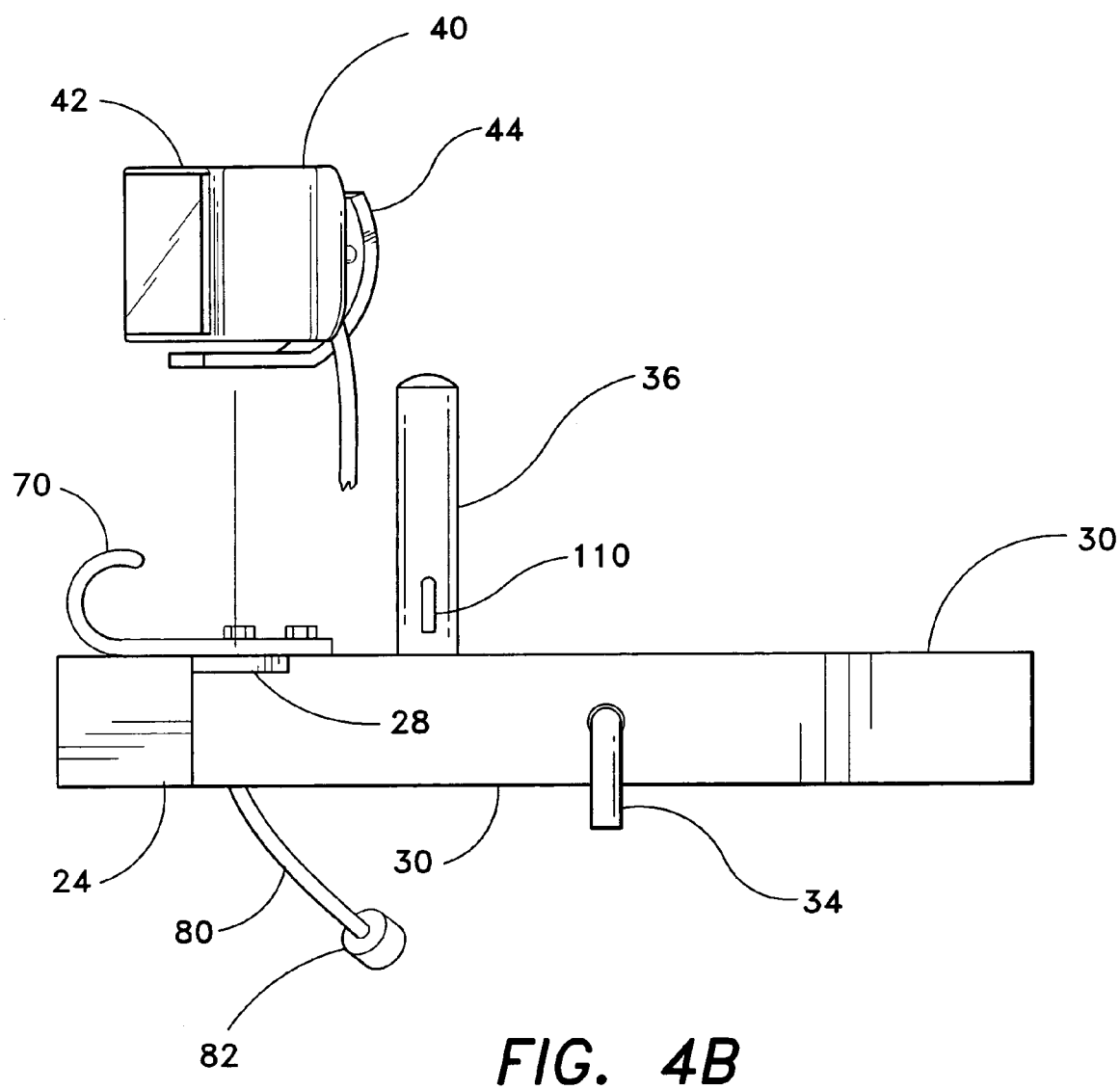
FIG. 4B is a side elevational view of the lighting and safety unit for a trailer hitch.

A lamp assembly 40 is mounted near each of the ends 22, 24 of the crossbar 20. Attachment of the lamp assemblies 40 is shown in FIGS. 4A and 4B. Each lamp assembly 40 includes a lamp 42 pivotally mounted to a bracket 44 such that the angle of the lamp 42 may be moved both horizontally and vertically within the bracket 44. Lamp 40 is a halogen lamp, or a similar source of bright lighting.

Lamp mounting tabs 28 extend from the rear of the crossbar 20 so that the lamp assemblies 40 may be set back somewhat from the front edge of the crossbar 20. This allows the lamp assemblies 40 to be protected by the crossbar 20. The lamp mounting tabs 28 may be, for example, a one by two inch rectangular piece of sixteen gauge plate welded to the rear edge of the crossbar 20 so that it is horizontally flush with the crossbar 20 and extends rearward. A lamp assembly 40 is then mounted to the lamp mounting tab 28. The lamp assemblies 40 preferably are halogen lamps.

The accessory mounting post 36 supports a variety of accessories. One such accessory is an elevated lighting assembly 50, shown in FIG. 2. The elevated lighting assembly 50 includes a vertical post 52, having lower 54 and upper 56 ends, and an elevated crossbar 60 attached to the upper end 56 of the vertical post 52. The vertical post 52 is a tube having an inside diameter sufficient to fit over the accessory mounting post 36 for support. An aperture 58 is formed through the lower end 54 to receive, in cooperation with an aperture formed in the accessory mounting post 36, an accessory locking pin 110. The elevated crossbar 60 has first and second ends 62, 64, and a longitudinal center 66. A mounting post 68 is vertically attached to the longitudinal center 66. The mounting post 68 is inserted into the upper end 56 of vertical post 52 to mount the elevated crossbar 60 atop the vertical post 52. Lamp assemblies 40 are attached to the first and second ends 62, 64, of the elevated crossbar 60.

Figure 3:
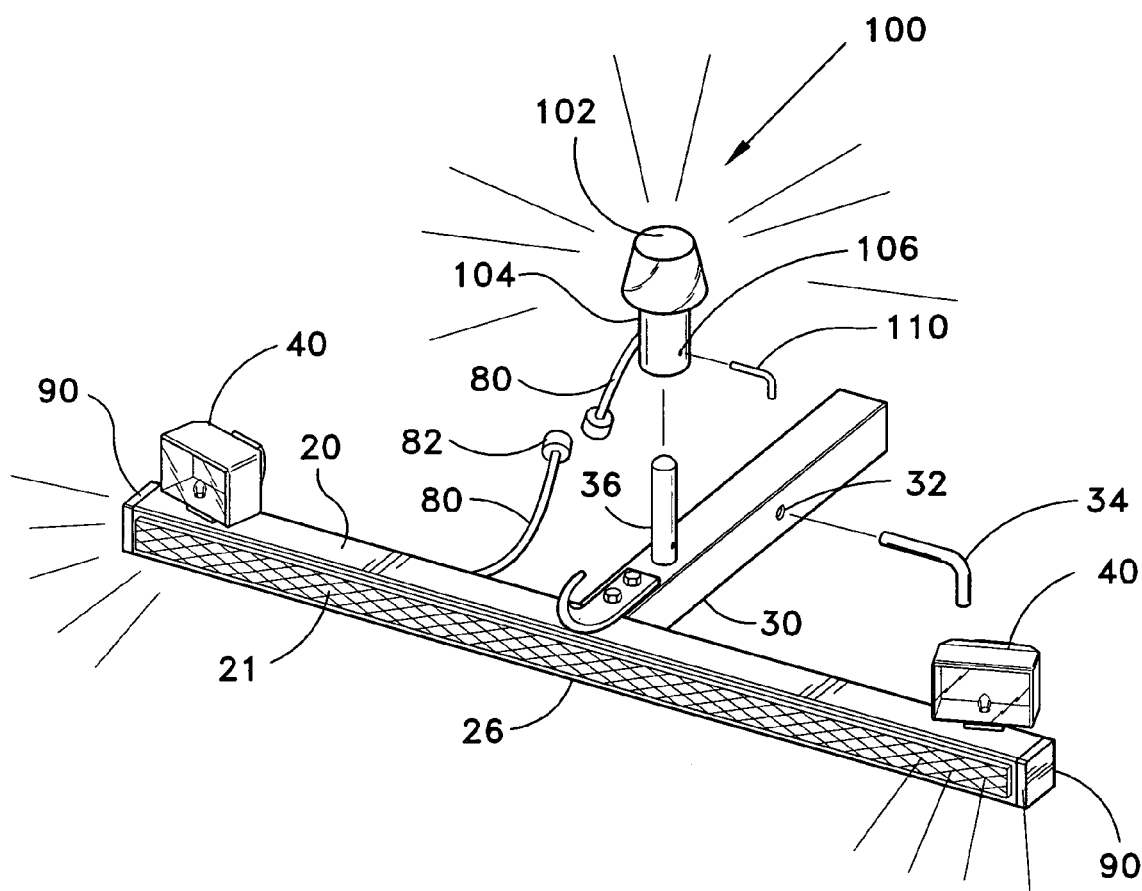
FIG. 3 is a perspective view of the lighting and safety unit for a trailer hitch with a safety strobe light attached.

Another accessory that may be mounted to the accessory mounting post 36 is a safety strobe assembly 100, shown in FIG. 3. The strobe assembly 100 includes a strobe light 102 attached to a strobe support post 104. The strobe support post 104 is a tube having an inside diameter sufficient to fit over the accessory mounting post 36 for support. An aperture 106 is formed through the strobe support post 104 to receive, in cooperation with the aperture formed through the accessory mounting post 36, the accessory locking pin 110.

Figure 5A:
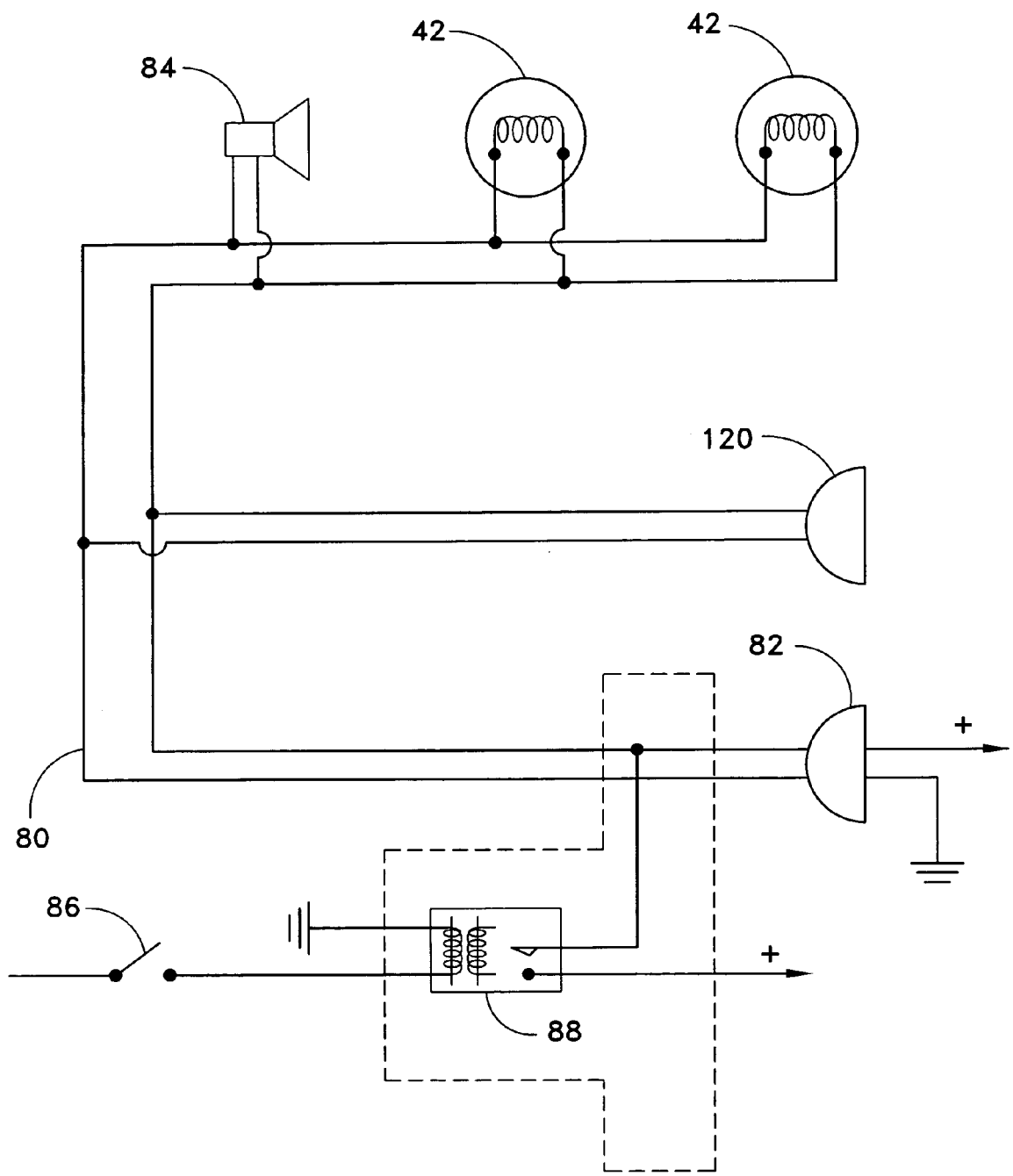
FIG. 5A is a schematic diagram of the lighting and safety unit for a trailer hitch.
Figure 5B:
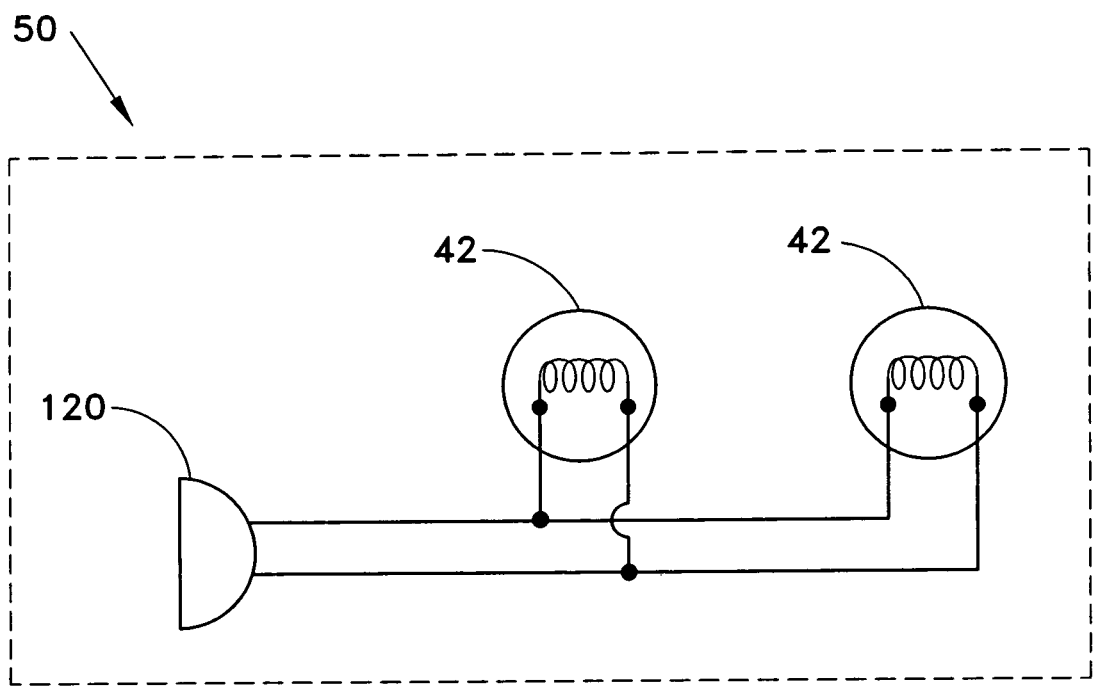
FIG. 5B is a schematic diagram of the elevated lighting assembly accessory for the lighting and safety unit for a trailer hitch.
Figure 5C:
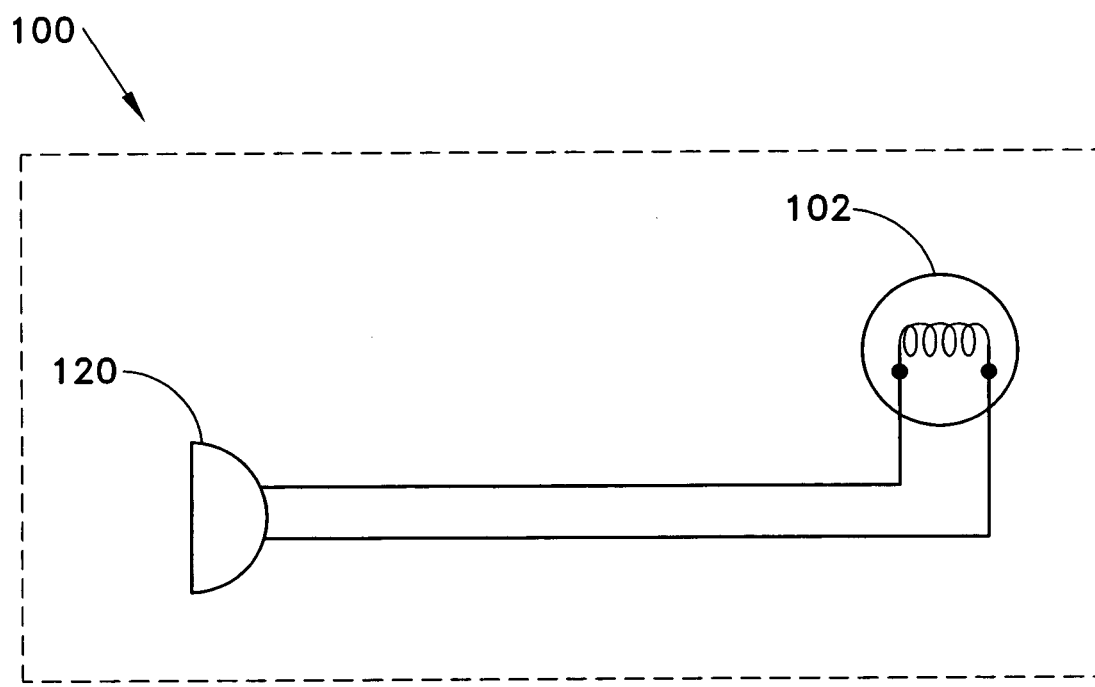
FIG. 5C is a schematic diagram of the safety strobe assembly accessory for the lighting and safety unit for a trailer hitch.

Wiring harness 80 is provided to connect the lamps and accessories to vehicle power. Connector 82 allows for a fast electrical connection to the vehicle power, and will typically be connected to the vehicle's reverse lighting power, so that the lamps are illuminated when the vehicle is put into reverse gear. FIGS. 5A, 5B and 5C show schematics of the wiring harness 80 along with accessory wiring. FIG. 5A shows a schematic of the lower crossbar lamp assembly. FIG. 5B shows a schematic of the optional elevated light assembly 50, and FIG. 5C shows a schematic of the optional strobe lamp assembly 100. As shown in FIG. 5A, a switch 86, along with a relay 88, may be provided to allow the lamps 42 to be powered independently from the vehicle's reverse lighting power. Additionally, the unit may include an audible warning alarm 84 to provide a warning as a vehicle is moved in reverse for enhanced safety. An accessory power connector 120 may be provided for fast electrical connection to the accessory systems.

It is to be understood that the present invention is not limited to the sole embodiments described above, but encompasses any and all embodiments within the scope of the following claims.

I claim:

1. A lighting and safety system for a trailer hitch, comprising:
    a crossbar of unitary construction having first and second ends and a longitudinal center;
    a mounting bar perpendicularly attached to the longitudinal center of said crossbar;
    an accessory mounting post attached to said mounting bar, said accessory post extending perpendicular to a plane in which said crossbar and said mounting bar are disposed;
    an elevated lighting assembly including:
        (a) a lighting assembly post having the lower end removably mounted to said accessory mounting post and an upper end vertically extending substantially beyond the lower end;
        (b) an accessory crossbar having first and second ends and a longitudinal center, said accessory crossbar being perpendicularly disposed on the upper end of said lighting accessory post; and
        (c) a lamp assembly disposed on the first and the second ends of said accessory crossbar;
    a lamp assembly disposed on each of said first and second ends of said crossbar; and
    a wiring harness in electrical communication with each of said lamp assemblies.

2. The lighting and safety system for a trailer hitch according to claim 1, further comprising a tow hook attached to said mounting bar.

3. The lighting and safety system for a trailer hitch according to claim 1, wherein each said lamp assembly further comprises:
    (a) a mounting bracket; and
    (b) a lamp pivotally mounted to said mounting bracket such that the lamp may be horizontally and vertically redirected.

4. The lighting and safety system for a trailer hitch according to claim 1, further comprising at least one reflector disposed on said crossbar.

5. The lighting and safety system for a trailer hitch according to claim 4, wherein said at least one reflector consists of a single strip of reflective tape extending substantially between the ends of said crossbar.

* * * * *